United States Patent [19]

Storey, Jr.

[11] 3,883,788
[45] May 13, 1975

[54] GYROSCOPE ORIENTATION CONTROLLER
[75] Inventor: Roy E. Storey, Jr., Rosenberg, Tex.
[73] Assignee: Sperry-Sun Well Surveying Company, Sugar Land, Tex.
[22] Filed: Oct. 26, 1973
[21] Appl. No.: 409,850

[52] U.S. Cl.............. 318/648; 318/684; 318/689; 318/671; 74/5.4; 74/5.6
[51] Int. Cl................G05b 11/12; G05b 17/00; G05b 11/01; B64c 17/02
[58] Field of Search........... 318/648, 649, 684, 689, 318/671; 74/5.4

[56] References Cited
UNITED STATES PATENTS

| 2,625,046 | 1/1953 | Squier | 318/648 |
|---|---|---|---|
| 3,225,229 | 12/1965 | Packard | 318/689 |
| 3,375,421 | 3/1968 | Ve Nard | 318/689 |
| 3,704,406 | 11/1972 | Lindsey | 318/684 |
| 3,704,407 | 11/1972 | Lindsey | 318/684 |

Primary Examiner—Robert K. Schaefer
Assistant Examiner—John Feldhaus
Attorney, Agent, or Firm—George L. Church; Donald R. Johnson; M. L. Murrah

[57] ABSTRACT

A gyroscope control system for maintaining a gyroscope rotor in a predetermined orientation utilizes the earth's gravity vector as a reference. A gravity sensitive mercury switch is placed on the gyroscope's rotor gimbal such that its conducting state changes when the rotor varies from the predetermined orientation. The mercury switch and a capacitor in series with the switch are connected into the rotor motor power circuit. The power circuit includes a power source that produces a square wave that acquires a ringing characteristic due to circuit impedance. The mercury switch switches the capacitor into the rotor motor circuit whenever the rotor varies from the predetermined location, thereby changing the amplitude of the ringing characteristic. An amplitude detection circuit measures the ringing amplitude and generates a control signal, which causes a reversible torque motor to re-orient the rotor.

23 Claims, 3 Drawing Figures

GYROSCOPE ORIENTATION CONTROLLER

BACKGROUND OF THE INVENTION

This invention relates to gyroscope control and more particularly to a system for maintaining a rotor of the gyroscope in a predetermined orientation.

Gyroscopes are important direction maintaining devices that find application in many areas. One such area is the petroleum industry where they are utilized in borehole survey instruments to determine the direction of a borehole. A borehold survey instrument normally includes a gyro, which acts as a compass, and an inclinometer, which measures the angular relationship of the borehole with the vertical axis. Gyroscopes used in survey instruments differ somewhat in design from conventional gyroscopes. Conventional gyroscopes usually include three pivotally mounted gimbals that allow the apparatus three degrees of freedom. This will allow the gyroscope's rotor axis to maintain a constant orientation regardless of the direction of movement of a device upon which the gyroscope is mounted.

Gyroscopes used in borehole survey instruments, however, contain only two gimbals due to size and space limitations in the surveying instrument. This allows the gyroscope only two degrees of freedom. Thus, when the orientation of the borehole surveying instrument changes, as it will do when it travels through a curved borehole it will apply a force to the gyroscope that causes precession of the inner gimbal, thereby causing the axis of the rotor motor to shift its orientation.

Due to the changing orientation of the gyroscope rotor axis, calculations must be performed on the data obtained from the modified gyroscope to obtain a reference direction that a conventional gyroscope would have itself maintained. To simplify the calculations it is desirable to maintain the rotor axis in a constantly oriented direction and allow the outer gimbal to move in response to the precessional forces.

One desirable orientation is to maintain the rotor axis in a plane perpendicular to the vertical axis of the gyro, which corresponds to the borehole axis. Thus, the borehole axis angle, which is measured by inclinometers, is always at 90° to the gyroscope rotor axis. However, this method requires that the rotor axis be forced into an ever-changing tilt plane. When the tilt axis is not in the same vertical plane as the rotor axis, such forces cause considerable displacement of the rotor axis that must be determined and accounted for. The displacements can be calculated if all parameters are known, but it must be established when the movements start and stop. This can be determined only when the instrument is on station and at rest. Thus, this method consumes both valuable measuring and calculating time.

A better method is to maintain the gyroscope's rotor axis oriented at 90° to the earth's gravitational vector, or in a horizontal plane. Maintaining the rotor axis in this plane provides considerable convenience in calculation since the horizontal plane is a convenient reference to which to relate directional information.

Several pieces of prior art address the problem of orienting rotatable devices such as gyroscopes. U.S. Pat. No. 3,704,406, by Lindsey is typical of the overall control system concept. The Lindsey Patent places a level sensing device on the rotor gimbal of the gyroscope. A generating device generates a data signal in response to the level sensing device. Electronic circuitry superimposes the data signal on the rotor motor power line; and the power line transmits the data signal to external circuitry. The circuitry removes the data signal from the power line and operates a torque motor in accordance with the information on data signal to move the outer gimbal. This applies leveling forces by the precessional principle to the inner gimbal.

A number of methods are used to obtain orientation information from the rotor gimbal. U.S. Pat. No. 3,703,832 by Lindsey et al uses a level sensor on the gyroscope rotor gimbal to activate a light source also on the rotor gimbal. Light sensors external to the gyroscope detect a light emanating from the light source, and external circuitry uses the information detected by the light sensors to control the level correcting torque motor. U.S. Pat. No. 3,599,494 by Lichte uses a variable shade between a light source and a light detector on the rotor gimbal to sense rotor orientation. Conductors carry the orientation information to external circuitry that controls a correcting motor. U.S. Pat. No. 3,704,406 by Lindsey in another variation employs an active electronic circuit to superimpose data detected by an orientation sensing device upon the rotor motor power line. Again, external circuitry and torque motor supply the correcting function.

It is therefore desirable to find a data transmission system for use in a gyroscope that minimizes the number of information conductors communicating with the rotor gimbal and that minimizes the amount of transmission equipment on the rotor gimbal.

SUMMARY OF THE INVENTION

With this and other objects in view, the present invention contemplates altering the amplitude of ringing present in a gyroscope's power signal with a directionally sensitive switching device when the gyroscope varies from a desired orientation. A detector circuit external to the gyroscope senses the ringing amplitude level and generates a control signal in response thereto. The signal is then used to control a torqueing motor, which reorients the gyroscope to the desired orientation.

A complete understanding of this invention may be obtained by reference to the following Detailed Description when read in conjunction with the accompanying drawings illustrating embodiments thereof.

DESCRIPTION OF THE PREFERRED EMBODIMENTS

Figure 1:
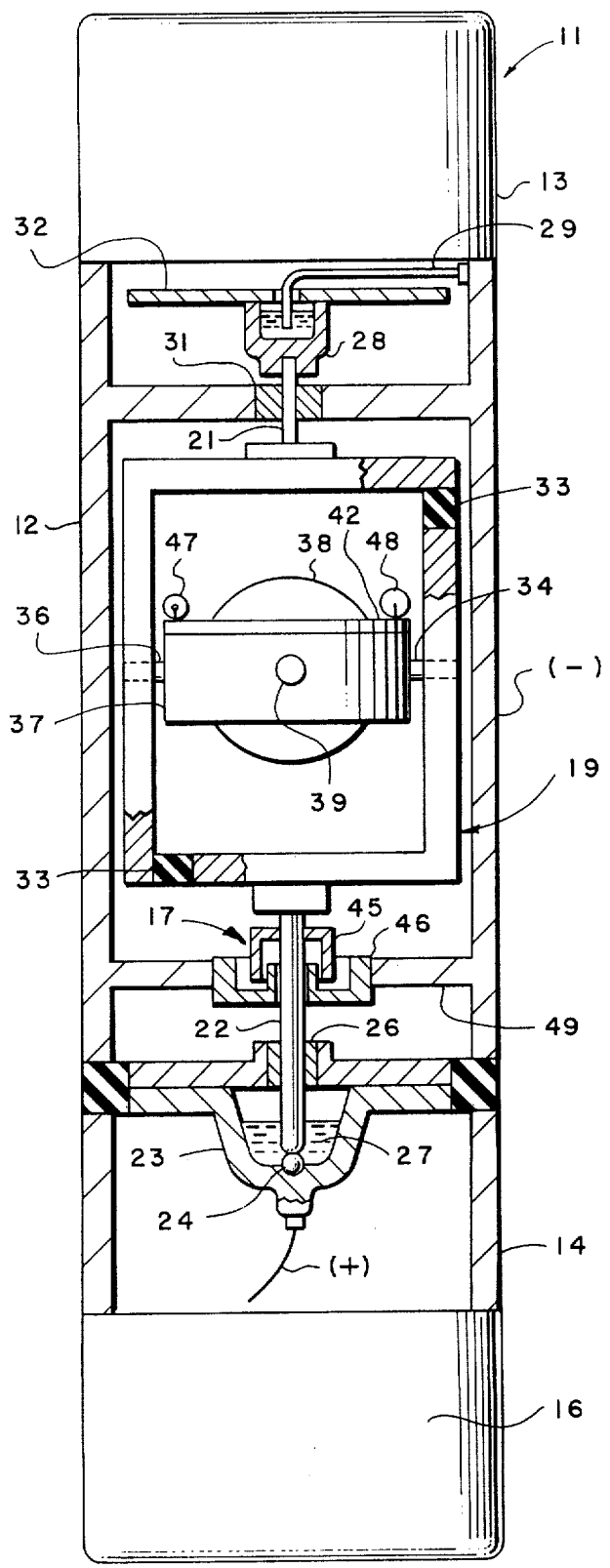
FIG. 1 is a cross-sectional view of a wellbore instrument embodying a gyroscope control system in which the present invention may be used.

FIG. 1 of the drawings shows a wellbore tool 11 having a housing 12 for encasing a gyroscope instrument. A photographic recording apparatus or the like may be mounted in Section 13 above the gyroscope for making readings indicative of the gyroscope position. Alternatively, circuitry may be provided for transmitting the signal to the surface to provide an instantaneous indication of the gyroscope position. Below the instrument section is a power supply unit 14 and circuitry 16 for controlling the operation of a torquing motor 17 attached to a vertical shaft 22 of the gyroscope. The outer gimbal 19 of the gyroscope has upwardly and downwardly extending vertical shafts 21 and 22 respectively which in turn are supported by bearings for rotation within the instrument housing. At the lower end of the lower vertical shaft 22 a cup 23 is provided within the housing for receiving the lower end of the shaft 22. A ball 24 is positioned between the lower end of the shaft and the bottom of the cup to furnish a pivotal support for the shaft. Annular bearings 26 are positioned about the shaft to provide horizontal support. The cup 23 is filled with mercury or some such conducting fluid 27 so that an electrical current applied to the bottom of the cup is transmitted by means of the conducting fluid to the vertical shaft 22 of the gyro. At the upper end of the gyroscope the upwardly extending vertical shaft 21 likewise has a mercury filled cup 28 mounted thereon. A wiper wire 29 extends inwardly from the wall of the housing 12 and is bent to extend downwardly into the mercury filled cup 28 to form a second conducting path of the gyroscope. The upper shaft 21 is supported in a horizontal direction by annular bearings 31. The instrument face 32 will be connected to the upper end of the cup or shaft to provide indications of the gyroscope position. Photographic apparatus in section 13 may be used to record the position of the instrument face. The vertical shafts 21 and 22 are in electrical communication with the outer gimbal of the gyroscope. Insulating members 33 are positioned in the gimbal walls so that the gimbal is divided into two separate conducting paths. These conducting paths in turn are in communication with opposed horizontal shafts 34 and 36, which are received within opposed walls of the outer gimbal and which extend downwardly to support an inner, or rotor, gimbal 37 of the gyroscope. The inner gimbal of the gyroscope is pivotally mounted on such horizontal shafts 34 and 46 and supports a rotor which is not shown within a rotor housing 38. The rotor is mounted about another horizontal shaft 39 perpendicular to the shafts 34 and 36 of the inner gimbal. As is well known in the construction of such gyroscope instruments, the inner gimbal 37 is divided into separate insulated portions similarly to the outer gimbal. These portions divide separate conducting paths from the shafts 34 and 36 to the rotor for supplying power to the rotor.

The torquing motor 17 is mounted about the downwardly extending vertical shaft 22 of the outer gimbal. The torquing motor is comprised of a rotor 45 which is attached to the vertical shaft and stator winding 46 which in turn is positioned on the mounting 49 extending within the instrument housing.

The inner gimbal 37 contains a rotor and rotor motor 38 attached to the inner gimbal 37 by a shaft 39. Also on the inner gimbal is a circuit board 42 upon which is mounted a capacitor 47 and a mercury switch 48.

In operation the wellbore tool 11 is inserted in a borehole in a portion of the drill pipe. The wellbore tool 11 follows the direction of the borehole and thus changes its orientation whenever the direction of the borehole changes. The rotor housing 38, driven by a rotor motor that is contained within the housing, rotates to maintain a constant rotor orientation by well known gyroscope principles. Whenever the orientation of the wellbore tool 11 changes, forces are applied to the outer gimbal 19 at vertical shafts 21 and 22 and to the inner gimbal 37 at shafts 34 and 36. The gyroscopic forces produced by the rotation of rotor housing 38 resist these forces. The result according to the well known precessional principle in gyroscopes is that the outer gimbal 19 and the inner gimbal 37 both rotate about their respective shafts 21–22 and 34–36, and the rotor housing 38 seeks a new orientation.

Figure 2:
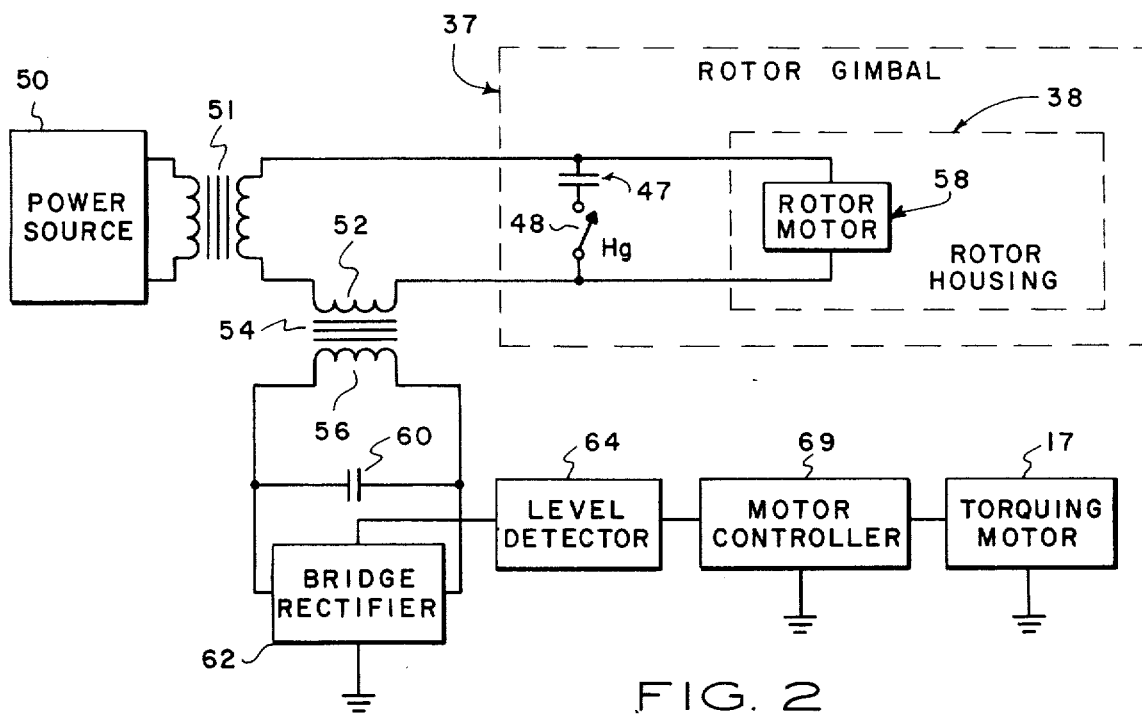
FIG. 2 is a schematic circuit diagram of an electronics circuitry that embodies the present invention.

FIG. 2 shows an electrical circuit that embodies the principles of the present invention. A power source 50 produces a square wave whose frequency is prefereably chosen to be 1000 hertz due to the characteristics of the gyroscope rotor motor. The power source 50 may be connected to a transformer 51. Transformer 51 may be connected in series with the primary winding 52 of a transformer 54 that has a secondary winding 56. The primary winding 52 of transformer 54 may also be connected in series to a rotor motor 58, which is contained within a rotor housing 38. The rotor motor 58 may be connected in series with transformer 51. A capacitor 47, or other impedance device, and a switch 48 that can be of the mercury type are preferably connected in parallel with the rotor motor 58. The rotor motor 58, the capacitor 48 and the mercury switch 48 may all be mounted on the inner gimbal 37 of the gyroscope.

The mercury switch 48 typically consists of a tube having spatially separated electrical contacts entering from the exterior. Also within the tube is a ball of mercury, which is free to move under the influence of gravity from one end of the tube to the other. When the ball is in the portion of the tube where the tube contacts are located, it will bridge the contact and form an electrical connection between the two contacts. In this situation the switch is closed. Conversely the switch reopens when the ball of mercury moves out of contact with the two contacts.

A capacitor 60 may be connected in parallel with the secondary winding 56 of transformer 54. A bridge rectifier 62 may be connected in parallel with capacitor 60 and secondary winding 56. Connected to the bridge rectifier 62 is a level detector 64 and a motor controller 69. The motor controller is connected to the torquing motor 17.

Figure 3:
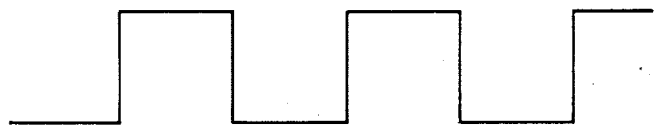
FIG. 3 is a drawing of signal waveforms present in the circuitry of FIG. 2.
Figure 3:
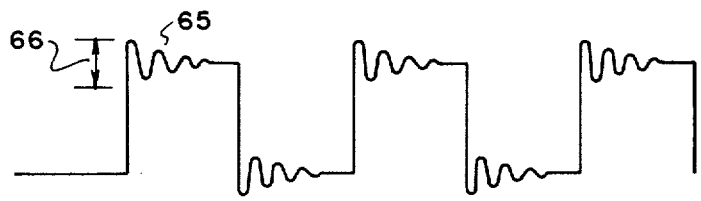
Figure 3:
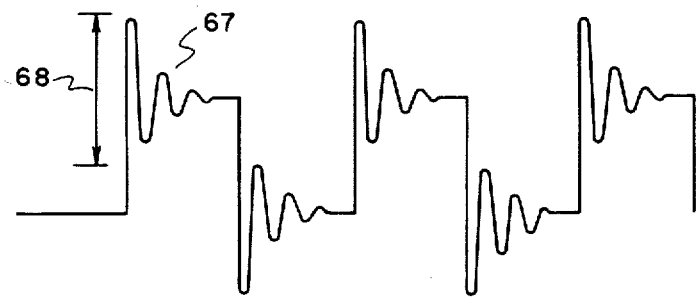

In operation, assuming that the inner gimbal is oriented such that mercury switch 48 is open, the power source 50 produces a square wave, which is characterized by an impulse wave portion, to power the rotor motor (see FIG. 3A). Transformer 51 alters the voltage and current characteristics of the power signal to match the requirements of the rotor motor. The impedance characteristics of transformers 51 and 52 as well as that of the rotor motor combine to cause the square wave shown in FIG. 3A to display a ringing characteristic 65 having an amplitude level 66 as shown in FIG. 3B. The secondary winding of transformer 54 is tuned by means of a capacitor 60 to filter our the 1,000 hertz square wave but to pass the ringing frequency, which typically is ten times the frequency of the signal supplied by the power source. The bridge rectifier 62 converts the filtered ringing voltage to a DC voltage level. A level detector circuit 64 detects the voltage level, and the motor controller 69 controls the direction of rotation of the torquing motor 17 in response to the level detected. The level detector is designed to discriminate between two voltage levels, and it causes the motor to rotate in one direction when it detects one level and in the opposite direction when it detects the other.

When the inner gimbal is oriented such that the mercury switch 48 is closed, the capacitor 47 will be switched into the circuit in parallel with the rotor motor. The impedance characteristic of the capacitor will alter the impedance characteristic of the entire circuit and thus change the amplitude 68 of ringing characteristic 67 as shown in FIG. 3C. Again the bridge rectifier 62 will produce a DC voltage level different from that when the mercury switch is closed. The level detector 64 will cause the torquing motor 17 to rotate in a direction opposite that when the mercury switch is open.

When the inner rotor gimbal is in a level position, or other desirable orientation that can be determined with respect to the direction of the gravity vector, the mercury switch will be barely open. In this case the control system will produce a signal that will cause the motor 17 to rotate in a direction that will close the switch. When the switch closes, the motor will reverse and cause the switch to reopen. The motor will thus maintain the mercury switch in an equilibrium position, which corresponds to the desired orientation. When the rotor gimbal varies from the desired orientation, the same process occurs to return the rotor gimbal to the desired orientation.

While particular embodiments of the present invention have been shown and described, it is apparent that changes and modifications may be made without departing from this invention in its broader aspects and therefore the aim in the above description is to cover all such changes and modifications as fall within the true scope and spirit of this invention.

What is claimed is:

1. In a gyroscope for use in a borehole survey instrument, a rotor orienting system, comprising: means for providing to the gyroscope rotor motor a power signal having an impulse characteristic; means for producing a ringing characteristic in the power signal; means for varying the state of a parameter of the ringing characteristic; means for detecting the state of the parameter; and means for orienting the rotor in response to the state of the parameter of the ringing characteristic.

2. The system of claim 1 wherein the means for providing a power signal is a generator.

3. The system of claim 2 wherein the generator produces a square wave.

4. The system of claim 1 wherein the means for producing a ringing characteristic is an impedance load.

5. The system of claim 4 wherein the impedance load is a capacitor.

6. The system of claim 1 wherein the means for varying a parameter of the ringing characteristic is a variable resistor means.

7. The system of claim 6 wherein the variable resistor means is a switch.

8. The system of claim 7 wherein the switch is a mercury switch.

9. The system of claim 1 wherein the means for detecting the state of the parameter comprises: means for removing the ringing characteristic from the power signal; means for isolating the parameter from other parameters of the ringing characteristic; and means for measuring the state of the parameter.

10. The system of claim 9 wherein the means for removing the ringing characteristic from the power signal is a frequency sensitive filter.

11. The system of claim 10 wherein the frequency sensitive filter comprises: a transformer; and a capacitor.

12. The system of claim 9 wherein the means for isolating the parameter is a rectifier.

13. The system of claim 12 wherein the rectifier is a bridge rectifier.

14. The system of claim 9 wherein the means for measuring the state of the parameter is a level detector.

15. The system of claim 1 wherein the orienting means is a motor.

16. The system of claim 1 further including means for controlling the orienting means.

17. In a gyroscope, a rotor orienting system, comprising: a square wave power generator in circuit with the rotor motor; a capacitor in the power circuit, whereby a ringing characteristic, having an amplitude different from that which naturally occurs may be produced in the power signal; a mercury switch on the rotor gimbal and connected in series with the capacitor, whereby the amplitude of the ringing characteristic may be altered when the rotor changes orientation; a transformer in the power circuit; a filtering capacitor in circuit with the transformer; a bridge rectifier in circuit with the transformer; a level detector in circuit with the bridge rectifier; a motor controller in circuit with the bridge rectifier; and an orienting motor in circuit with the bridge rectifier.

18. In a gyroscope for use in a borehole survey instrument, apparatus for producing a datum on a square wave power signal to control the orientation of the rotor, comprising: an impedance load, whereby a ringing characteristic different from that which naturally occurs may be imposed on the square wave; and switch means in circuit with the impedance load, whereby the ringing characteristic of the square may be varied when the orientation of the rotor gimbal varies.

19. The apparatus of claim 18 wherein the impedance load is a capacitor.

20. The apparatus of claim 19 wherein the switch means is a mercury switch.

21. In a gyroscope for use in a borehole survey, instrument, a rotor tilt control system, comprising: a square wave power signal generator in circuit with the rotor motor; an impedance load in the power circuit, whereby a ringing characteristic may be imposed on the power signal; a directionally sensitive switch in circuit with the impedance load; a filter in the power circuit tuned to the frequency of the ringing characteristic; a voltage rectifier in circuit with the filter; and a voltage level detector in circuit with the rectifier.

22. A method of controlling the orientation of a gyroscope rotor whose motor is powered by a signal having an impulse characteristic, comprising the steps of: sensing variation of the rotor from a predetermined orientation; altering a parameter of a ringing characteristic in the power signal; and regulating the orientation of the rotor in response to the parameter of the ringing characteristic.

23. A method of orienting a gyroscope rotor that is powered by a signal having an impulse characteristic, comprising the steps of: sensing variation of the rotor from a predetermined orientation; altering the amplitude of a ringing characteristic in the power signal in response to the variations; sensing the amplitude of the ringing characteristic; and precessing the rotor in response to the amplitude of the ringing characteristic.

* * * * *